Merritt & Gibbs.
Animal-Trap.
Nº 86175. Patented Jan. 26, 1869.
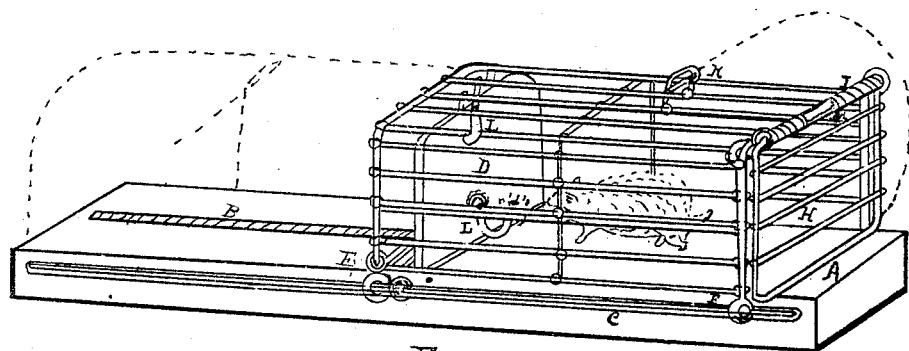
Fig: 2.
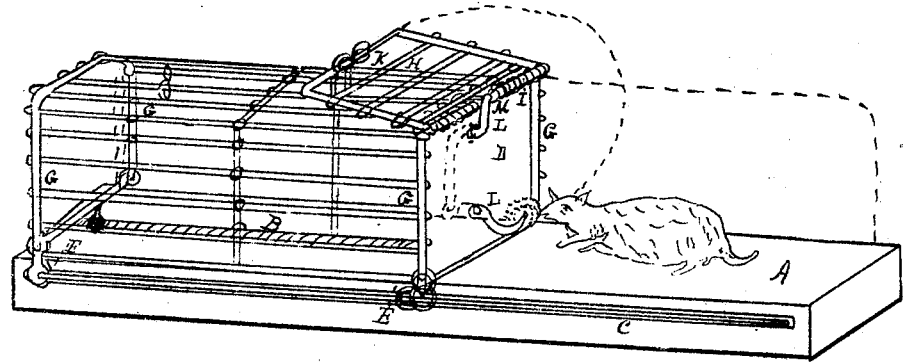
Fig: 1.
Witnesses
Wm Vine
Geo. F. Foote
Inventors
Geo. W. Merritt
Harvey S. Gibbs

United States Patent Office.

GEORGE W. MERRITT AND HORACE S. GIBBS, OF NORWALK, CONNECTICUT.

Letters Patent No. 86,175, dated January 26, 1869.

IMPROVED ANIMAL-TRAP.

The Schedule referred to in these Letters Patent and making part of the same.

*To all whom it may concern:*

Be it known that we, GEORGE W. MERRITT and HORACE S. GIBBS, both of the town of Norwalk, county of Fairfield, and State of Connecticut, have invented a new and useful Improvement in the Mode of Constructing Animal-Traps; and we do hereby declare that the following is a full and correct description thereof, reference being had to the accompanying drawing, and to the letters of reference marked thereon.

The nature of our invention consists in the arrangement of a trap whose whole frame shall suddenly slide or jump forward, and enclose the animal, when the bait is disturbed.

To enable others skilled in the art to make and use our invention, we will proceed to describe the same.

The drawing—

Figure 1, is a perspective view of the trap when it is set and baited.

Figure 2 is a perspective view when the trap is sprung, and the animal secured.

Our trap is composed of open wire-work, or its equivalent, as shown in the drawing, with a wooden platform or base, to support the same, A.

This platform is of the same width as the wire frame, and double the length of the same.

A groove or slot and hole are made in the centre of the platform, at B, to receive a spiral spring, to work longitudinally in the same, the back end being fastened to the cross-rod of the frame, and the other end fastened at the front of the platform.

This spring is the main operator for throwing the trap forward.

On each edge of the platform is a rod, C, running the whole length.

These rods receive eyes, F, made in the lower ends of the four vertical corner wires, G, to slide backward and forward with the frame.

In the centre of the platform A, we place a vertical permanent partition or division, D, fastened to and across the platform, so that, when the trap is set, it forms the front, and, when the trap is discharged or sprung, forms the back, as shown in the drawing.

On this partition we attach the hook for the bait, and the trigger for springing.

The front flap or door, H, is hung on the upper cross-rod I, and is operated by means of a spiral spring wound round the upper rod, M.

The back of the trap has no closed end till it is discharged. Then the partition D forms one.

To set and bait this trap, the frame is drawn back to the end of the platform A. Then turn up the front door, H, and fasten it on the roof by the sliding hook K. The upper end of the bait-hook L is placed in front of the cross-rod of the door, which holds the whole in position. The bait is then placed on the hook, which is outside of the door, leaving the platform clear, for the animal to approach the bait.

When the trap is set, the animal attacks the bait, and springs the trap, which instantly, and with lightning quickness, slides forward, and jumps over him, and secures him on the inside of the trap, the door, of course, falling down at the same time.

The utility of our trap is in the bait being placed on the outside, on the platform, so that the whole frame of the trap may be covered or disguised, so that the most cunning and timid animals will approach without alarm, when they would not go inside to take the bait.

Our trap may be made upon the same principle for any-sized animal, large or small.

What we claim as our invention, and desire to secure by Letters Patent, is—

The arrangement of the sliding animal-trap, with the spiral spring and slide-rods, in the manner and for the purpose substantially as herein described.

GEO. W. MERRITT.
HORACE S. GIBBS.

Witnesses:
WM. VINE,
JOSEPH F. FOOTE.